2 Sheets--Sheet 1.

D. C. BAUGHMAN.

Thrashing-Machines.

No. 5,217. Reissued Jan. 7, 1873.

Witness:
F. L. Durand
C. L. Everett.

Inventor,
David C. Baughman
per
Alexander Nasby
Attorneys.

AM. PHOTO-LITHOGRAPHIC CO. N.Y. (OSBORNE'S PROCESS.)

2 Sheets--Sheet 2.

D. C. BAUGHMAN.

Thrashing-Machines.

No. 5,217. Reissued Jan. 7, 1873.

Witness:
W. L. Durand
C. L. Ewert.

Inventor
David C. Baughman.
per
Alexander Dunsor
Attorneys.

AM. PHOTO-LITHOGRAPHIC CO. N.Y. (OSBORNE'S PROCESS.)

UNITED STATES PATENT OFFICE.

DAVID C. BAUGHMAN, OF TIFFIN, OHIO.

IMPROVEMENT IN THRASHING-MACHINES.

Specification forming part of Letters Patent No. 115,680, dated June 6, 1871; reissue No. 5,217, dated January 7, 1873.

*To all whom it may concern:*

Be it known that I, DAVID C. BAUGHMAN, of Tiffin, in the county of Seneca and in the State of Ohio, have invented certain new and useful Improvements in Thrashing-Machines; and do hereby declare that the following is a full, clear, and exact description thereof, reference being had to the accompanying drawing and to the letters of reference marked thereon.

My invention consists in the peculiar construction and arrangement of a thrashing-machine, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
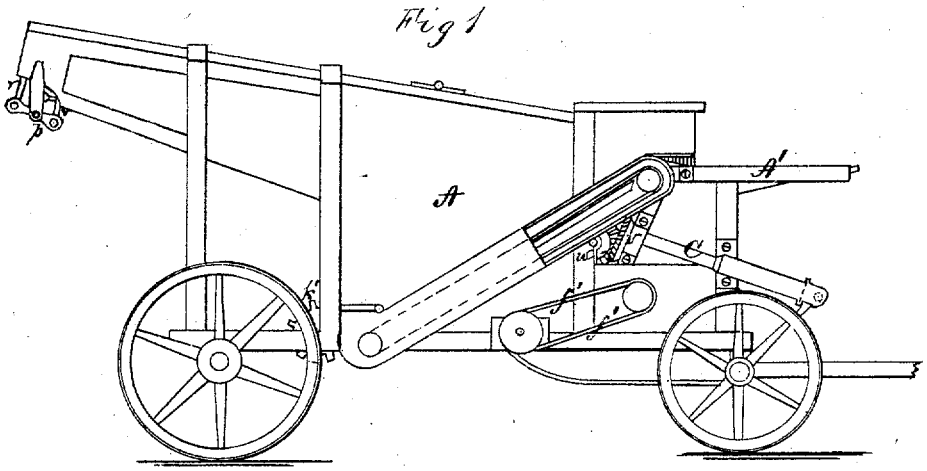
Figure 2:
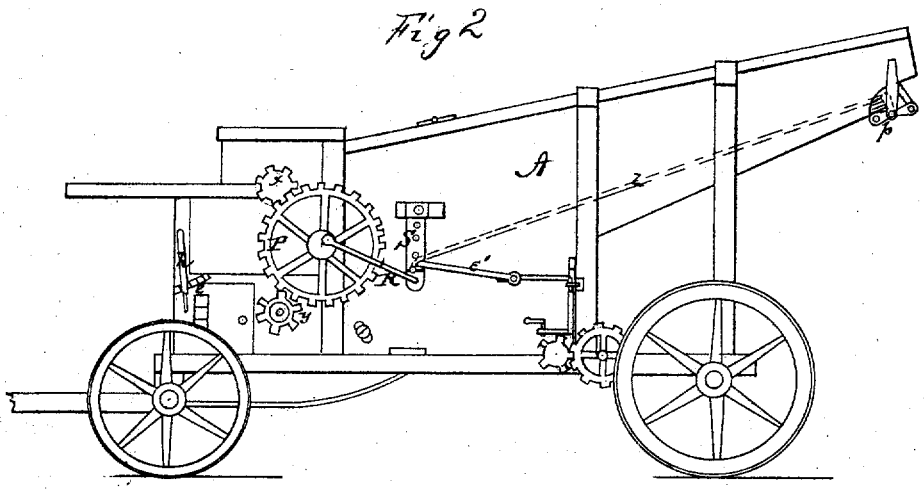
Figure 3:
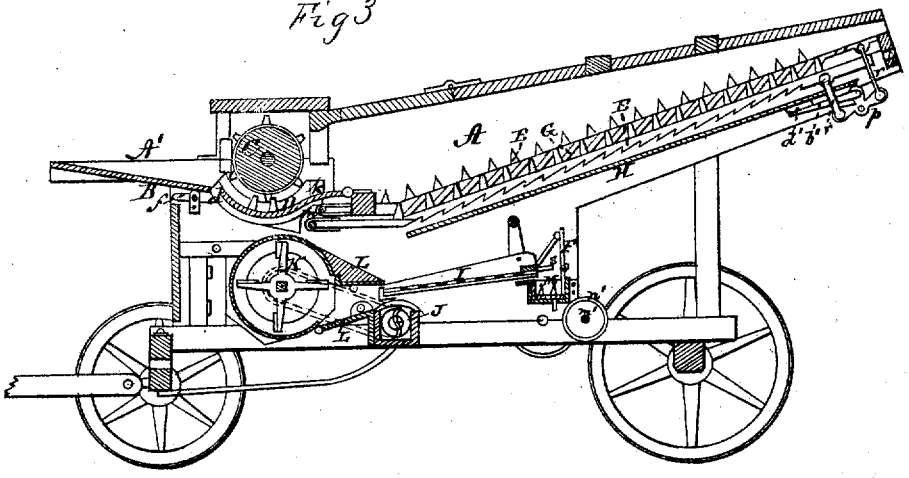
Figure 4:
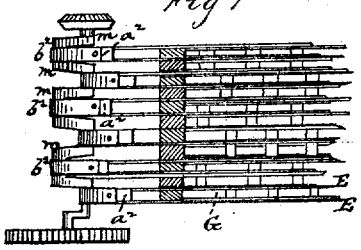
Figure 5:
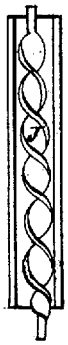
Figure 6:
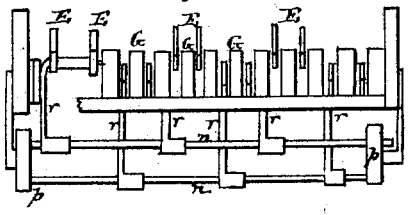
Figure 7:
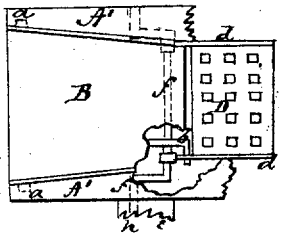
Figure 8:
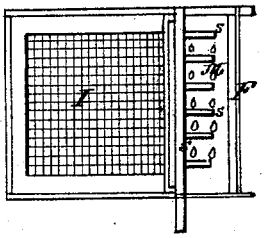
Figure 9:
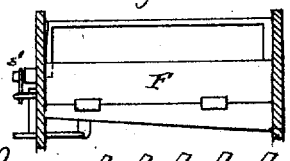
Figure 10:
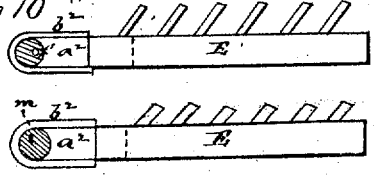

Figure 1 is a side elevation of my machine, showing the elevator side; Fig. 2 is a side elevation of the opposite side of the machine; Fig. 3 is a longitudinal vertical section of the same; Fig. 4 is a plan view of the lower or front end of the toothed bars with the crank-shaft; Fig. 5 is a plan view of the conveyer; Fig. 6 is a rear view, showing the mechanism for operating the upper or rear ends of the toothed bars; Fig. 7 is a plan view of the feed-table and spiked concave; Fig. 8 is a plan view of the sieve, and toothed tailing-board; Fig. 9 is a rear view of the same; and Fig. 10 shows the mode for operating the toothed bars.

A represents the frame of my machine, which is supported upon wheels so that the machine can readily be moved from place to place where needed. At the front end of the frame A is the feed-table B, over which the unthrashed grain passes in between the spiked or toothed cylinder C and the spiked or toothed concave D. The feed-table B is held at its front or outer edge by means of pins *a a*, which are inserted in grooves on arms $A^1$ $A^1$ extending forward from the frame A; and at its inner or rear edge the feed-table is held by a hook, *b*, catching in one of the hangers, *d*, which support the concave D. The hangers *d d* are curved, and hinged or pivoted at their rear ends, and at their front ends are attached arms, which are inserted in ears projecting downward from a crank-shaft, *f*; or the front ends of the hangers themselves may be inserted in said ears. On one end of the crank-shaft *f* is a lever, *h*, which projects downward on the side of the machine, and can be moved backward or forward to raise or lower the front ends of the hangers, said levers being held at any desired point in a toothed bar or rack-bar, *e*. The inner sides of the hangers *d d* are grooved longitudinally, and in the same, at the rear ends of the hangers, is inserted a convex plate, *k*, and then the toothed or spiked concave D, which is thus placed directly under the cylinder C.

It will be seen that by means of the lever *h* and crank-shaft *f* this concave may be brought closer to or further from the cylinder, as may be necessary or desired.

The grain and straw are thrown forward onto the toothed bars E E, the straw being carried toward the rear by the said toothed bars, while the grain and chaff or other small stuff fall down, through the cleated bars G G, onto the shaker or grain-receiver H. The toothed bars E E are attached, at their front ends, to a shaft, *m*, having alternate cranks, as shown in Fig. 4. Upon each crank of the shaft *m* is placed a dividing-block, $a^2$, which may be attached to the crank by means of a metallic strap or band, $b^2$, as shown in Fig. 10; or it may be attached in any other suitable manner, so that the block $a^2$ forms the whole or part of a box to be operated by and connected to said shaft. To each of the series of dividing-blocks thus arranged upon the crank-shaft *m* are attached two or more of the toothed bars E, which allows of said toothed bars being placed closer together than otherwise could be done. In place of the shaft with alternate cranks I may use a straight shaft with a series of eccentrics, $x^1$, set at varying angles on the same, and the toothed bars connected to said eccentrics. Between the toothed bars E E are placed the cleated bars G G, the construction of which is made the subject of a separate patent. At the upper or rear end of the frame A are two shafts, *n n*, attached to the ends of bars *p*, which are pivoted in their centers, and operated by means that will be hereinafter described, so as to rock on their pivots, thus alternately raising and lowering each shaft. One of these rock-shafts, *n*, is attached, by means of vibrating rods or bars *r*, to one set of toothed bars, E, and the other rock-shaft is, in the same manner, attached to the other set of toothed bars, so as to raise one set and drop the other set of toothed bars at one and the same time, and shove one set forward and draw the other set backward at the same time. Thus, while one set is rising above the cleated bars, the other set is dropping below the upper surface of them. The set raised above the cleated bars, as soon as it attains its highest point, begins to move away from the cylinder, thus carrying the straw toward the stacker, while at the same time the other set is carried back entirely below the upper surface of the cleated bars. The under sides of the toothed bars E E are notched or provided with small teeth, so that during their downward and forward motions they will facilitate the passage of the grain on the bottom or shaker H, and prevent the chaff or other stuff, which has passed down with the grain, from clogging. From the bottom H the grain falls onto the sieve I, and from thence into the conveyer J, and carried out at the side of the machine. The chaff is blown over the sieve I by means of the fan K, which is situated under the concave D, and in rear of said fan, between it and the sieve, are two wind-boards, L L, one above and the other below. These wind-boards are adjustable, so that the direction of the blast can be readily regulated. The tailings fall through a rake, *s*, hinged or pivoted at the rear end of the sieve I, and onto a toothed tailing-board, M, which carries the tailings into the elevator N, so as to be carried up and dropped into the machine again between the cylinder and concave. F represents a hinged door, arranged in rear of the tailing-board, whereby the tailings are directed onto said board.

The various parts of my machine are operated in the following manner: On the side of the frame A, at the front end, is a shaft, O, turned by any suitable or convenient power in any desired manner. Upon the rear end of this shaft is a bevel-wheel, *v*, which gears with and imparts rotary motion to a pinion attached on one end of the crank-shaft *m*. On the other end of this crank-shaft is a cog-wheel, P, which gears with pinions *x* and *y* upon the shafts for the cylinder C and fan K, respectively, thus imparting the necessary rotary motion to said cylinder and fan. Attached to a wrist-pin on wheel P is a rod or pitman, R, which connects with an arm, S, hinged or pivoted upon the outside of the frame, by means of which said arm obtains a vibrating motion. From this vibrating arm a rod, *z*, connects with an arm, $a^1$, extending upward from the center of one of the bars *p*, in the ends of which the rock-shafts *n n* are placed, as above described, said shafts by this means obtaining their rocking motion. From both of the bars *p p* arms $a^1$ $a^1$ extend upward, and from these arms rods $b'$ $b'$ connect with a cross-bar, $d'$, to which the movable bottom H is attached, whereby said bottom also obtains its necessary reciprocating motion. Another rod, $e'$, connects the vibrating arm S with the sieve or riddle I, and also with the toothed board M in the tailing-box by means of suitable connecting-rods, whereby motion is imparted to both. A belt, $f'$, shown in Fig. 1, conveys motion from the fan-shaft to the conveyer. Upon the opposite end of the lower belt-shaft for the elevator N is a pinion, $h'$, which gears with a cog-wheel, $k'$, upon a shaft, $m'$, having its bearings on the beams supporting the whole machine, and upon this shaft are suitable pulleys $n'$, from which motion may be communicated to the stacker for running the same.

Having thus fully described my invention, what I claim as new, and desire to secure by Letters Patent, is—

1. The rock-shafts *n n*, in combination with the toothed bars E E, substantially in the manner and for the purposes herein set forth.

2. The movable bottom H, shafts *n n*, and vibrating arm S, constructed and arranged substantially as and for the purposes herein set forth.

3. The vibrating arm S, with its connections R, *z*, and $e'$, arranged to operate substantially as and for the purposes herein set forth.

4. The bailing-board M, provided with teeth on its upper side, and arranged in relation to the elevator N substantially as herein set forth.

5. The arrangement of the belt $f'$ connecting the fan-shaft with the conveyer, the pinion $h'$ on the conveyer-shaft, cog-wheel $k'$, shaft *m*, and pulleys $n'$ $n'$, said pulleys to be connected with the stacker, all substantially as described.

6. In combination with a shaft having a series of cranks or eccentrics set at opposite or varying angles, a series of dividing blocks, $a^2$, each of which is placed upon and operated by one of such cranks or eccentrics, and has two or more toothed bars, E, attached to it, substantially as and for the purposes herein set forth.

In testimony that I claim the foregoing I have hereunto set my hand this 9th day of November, 1872.

DAVID C. BAUGHMAN.

Witnesses:
JOHN GWYNN,
A. H. BYERS.